Jan. 27, 1931. G. FULLMER 1,790,266
REENFORCEMENT FOR PIPE LINE JOINTS
Filed April 17, 1929
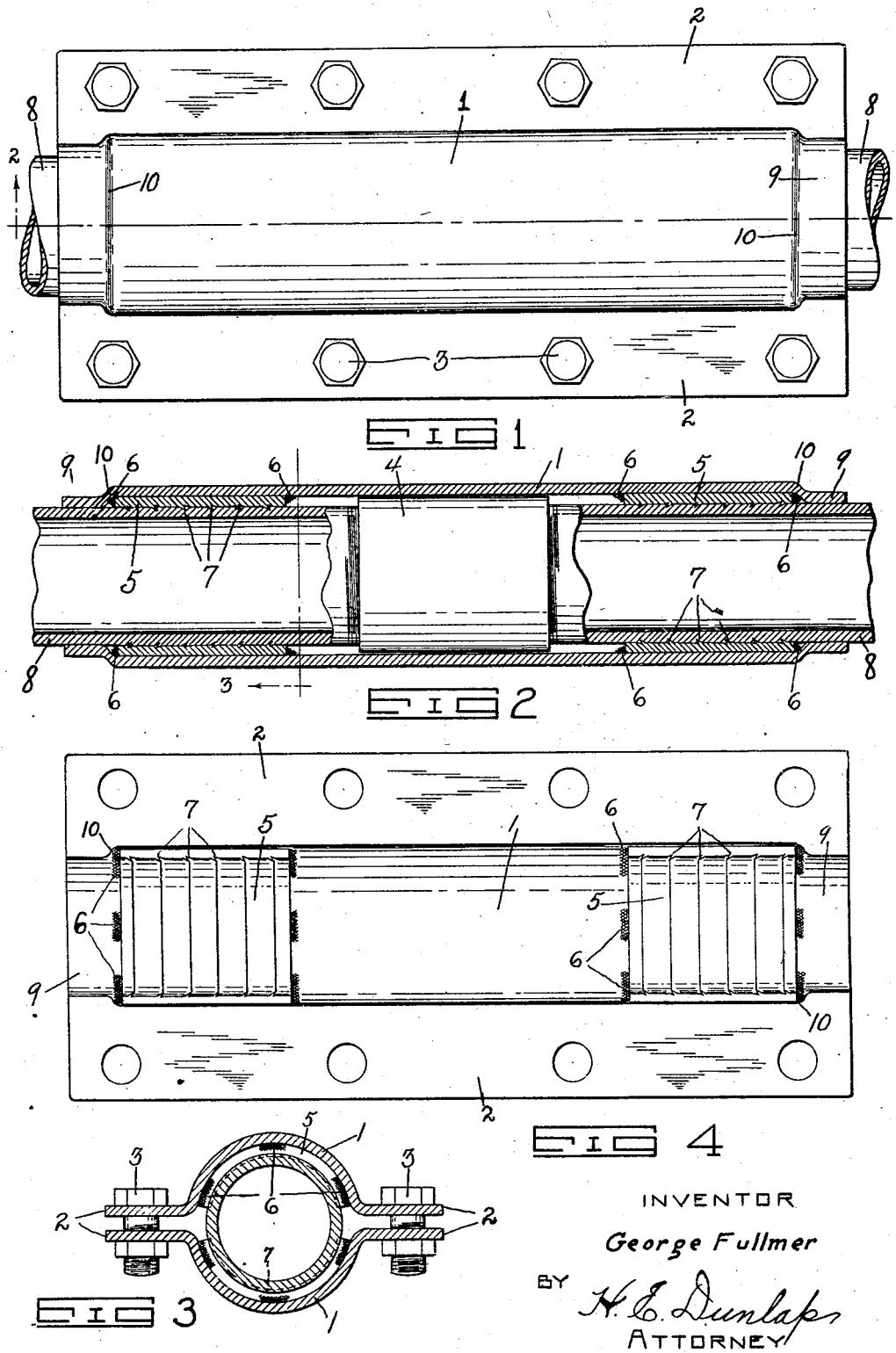
INVENTOR
George Fullmer
BY H. E. Dunlap
ATTORNEY Patented Jan. 27, 1931

1,790,266

UNITED STATES PATENT OFFICE

GEORGE FULLMER, OF BENWOOD, WEST VIRGINIA; KATHERINE FULLMER, ADMINISTRATRIX OF SAID GEORGE FULLMER, DECEASED

REENFORCEMENT FOR PIPE-LINE JOINTS

Application filed April 17, 1929. Serial No. 355,697.

This invention relates to pipe line joint reenforcements, and the primary object thereof is to provide improved means designed to be applied to lines of pipe laid on or above the surface of the ground for carrying oil, gas and the like, so as to prevent breaking or injury to the joints of such pipe which frequently occurs due to the strains imposed on the lines by the slippage of earth, falling trees, or shifting of the position of the pipe line due to various causes.

The invention further aims to provide a reenforcement of this type which is of simple construction and which effectively strengthens and reenforces the joint and the pipe line on each of the sides opposite to the joint.

In describing the invention in detail, reference is herein had to the accompanying drawings, in which—

Fig. 1 is a top plan view of the invention;

Fig. 2 is a section on line 2—2 of Fig. 1;

Fig. 3 is a section on line 3—3 of Fig. 2; and—

Fig. 4 is a plan view of the interior of one of the clamp members.

In proceeding in accordance with the present invention, a pair of similar and complementary clamp members 1 are employed, each having a flange extending longitudinally and laterally thereof on each of its sides, as indicated at 2, the flanges being drawn together in clamping relation to the pipe line or to the joint thereof by means of bolts 3. The members 1 are curved in cross-section so as to conformably fit against the joint 4 of the pipe line and have curved inserts 5 secured to their inner faces preferably by means of spot welding as shown at 6.

The inner circumferential faces of said inserts 5 are provided with arcuate ribs 7 beveled to form a cutting edge which is designed to bite into the pipe section 8 upon drawing the clamp members together through the medium of the bolts.

By reference to Fig. 2 of the drawings, it will be seen that the inner peripheries of the inserts 7 have the same diameters as that of the joint 4. Consequently, the clamp members are held in line and prevented from being distorted upon tightening of the bolts.

It will be further noted that there is a pair of the inserts on each of the opposite sides of the joint 4. The ends 9 of the members 1 are extended at an incline toward the pipe sections and closely embrace the said pipe sections, thereby to increase the strengthening or reenforcing action of the members.

From the foregoing, it will be seen that, due to the shoulders afforded by the inwardly extending of the ends 9 of the clamp members, as shown at 10, said shoulders enable accurate positioning of the inserts so as to properly locate the inserts during the spot welding, thus facilitating the latter operation.

The invention thus provides a simple construction comprising, excluding the fastening bolts, but the two clamp members, inasmuch as the securement of the inserts to such members in the manner described virtually makes them a part of the clamping members.

What is claimed is:—

1. A reenforcement for pipe line joints, comprising complemental clamp members adapted to enclose a pipe joint, the opposite end portions of said members being contracted and having an internal diameter corresponding to the external diameter of the coupled pipes and being adapted to closely embrace the latter, the intermediate portions of said members having a uniform diameter at least equal to that of the enclosed coupling and a length materially exceeding that of said coupling, inserts carried interiorly of said coupling members for gripping said pipes intermediate the coupling and said contracted end portions, and means to secure said members in place, said inserts having teeth formed on their internal faces for biting into the embraced pipes.

2. A reenforcement for pipe line joints, comprising complemental clamp members adapted to enclose a pipe joint, the opposite end portions of said members being contracted and having an internal diameter corresponding to the external diameter of the coupled pipes and being adapted to closely embrace the latter, the intermediate portions of said members having a uniform diameter at least equal to that of the enclosed coupling and a length materially exceeding that of said coupling, inserts rigidly mounted interiorly of said members for gripping said pipes intermediate the coupling and said contracted end portions, and means to secure said members in place, said inserts having arcuately sharpened ribs formed on their internal faces for biting into the embraced pipes.

In testimony whereof, I affix my signature.

GEORGE FULLMER.